US005395667A

United States Patent [19]

Ohno et al.

[11] Patent Number: 5,395,667

[45] Date of Patent: Mar. 7, 1995

[54] AIR BAGGAGE TAG

[75] Inventors: Akihiko Ohno; Takatoshi Nishizawa; Akira Iwai, all of Ibaraki, Japan

[73] Assignee: Oji Yuka Goseishi Co., Ltd., Tokyo, Japan

[21] Appl. No.: 192,698

[22] Filed: Feb. 7, 1994

Related U.S. Application Data

[62] Division of Ser. No. 7,275, Jan. 21, 1993, Pat. No. 5,318,817.

[30] Foreign Application Priority Data

Jan. 21, 1992 [JP] Japan .................................... 4-8295
Apr. 16, 1992 [JP] Japan .................................... 4-96645

[51] Int. Cl.[6] ........................ B42D 15/00; B29D 7/00; G09F 3/02

[52] U.S. Cl. .................................... 428/40; 428/354; 428/315.9; 428/317.9; 283/80; 40/6; 40/665

[58] Field of Search ............... 40/6, 665; 428/40, 354, 428/343, 315.9, 317.9; 283/80, 81

[56] References Cited

U.S. PATENT DOCUMENTS

| | | | |
|---|---|---|---|
| 3,773,608 | 11/1973 | Yoshimura et al. . | |
| 3,799,828 | 3/1974 | Takashi et al. . | |
| 3,841,943 | 10/1974 | Takashi et al. . | |
| 4,075,050 | 2/1978 | Takashi et al. . | |
| 4,191,719 | 3/1980 | Jack et al. . | |
| 4,318,950 | 3/1982 | Takashi et al. . | |
| 4,341,880 | 7/1982 | Toyoda et al. . | |
| 4,634,849 | 1/1987 | Klingen . | |
| 4,772,512 | 9/1988 | Nagafuchi . | |
| 4,951,971 | 8/1990 | Whited . | |
| 5,092,949 | 3/1992 | Goncalves | 156/179 |
| 5,145,211 | 9/1992 | McKillip . | |
| 5,151,403 | 9/1992 | Suzuki et al. | 503/200 |
| 5,226,994 | 7/1993 | Breen | 156/152 |
| 5,316,777 | 5/1994 | Toyoda et al. | 428/315.9 X |
| 5,318,817 | 6/1994 | Ohno et al. | 428/354 X |

FOREIGN PATENT DOCUMENTS

| | | |
|---|---|---|
| 8802903 | 4/1988 | European Pat. Off. . |
| 325515A | 7/1989 | European Pat. Off. . |
| 2213460 | 8/1989 | United Kingdom . |

OTHER PUBLICATIONS

EPO Search Report conducted Apr. 8, 1993 in parent allowed divisional 5,318,817.
Japanese J78032386–B Abstract.
Japanese J71040794–B Abstract.
Japanese J52073985–A Abstract.

*Primary Examiner*—Daniel R. Zirker
*Attorney, Agent, or Firm*—Sughrue, Mion, Zinn, Macpeak & Seas

[57] ABSTRACT

An air baggage tag readable by a bar code reader is composed of a recording layer, a substrate, a pressure sensitive adhesive layer, and release paper, wherein the substrate has a laminate structure composed of ($A^1$) a fine void-containing stretched thermoplastic resin film and ($A^2$) a substantially void-free uniaxially stretched thermoplastic resin film having a transverse Elmendorf tear strength of at least 80 g, the thickness of the uniaxially stretched thermoplastic resin film ($A^2$) is from 10 to 60% of the total thickness of the substrate, and the recording layer is provided on the side of the stretched thermoplastic resin film ($A^1$) opposite to the stretched thermoplastic resin film ($A^2$) and has printed thereon a bar code. The baggage tag has high tear strength while exhibiting satisfactory printability and therefore, when attached to each piece of air baggage, is not easily torn apart even on being pulled.

12 Claims, 2 Drawing Sheets

AIR BAGGAGE TAG

This is a divisional of application Ser. No. 08/007,275, filed Jan. 21, 1993, and allowed Dec. 16, 1993, now U.S. Pat. No. 5,318,817.

FIELD OF THE INVENTION

This invention relates to an air baggage tag having excellent tear strength and printability.

BACKGROUND OF THE INVENTION

Each piece of air baggage, such as trunks, suitcases, and boxes, is managed by attaching a tag having thereon information including the name or mark of the airline, the final destination, the transit point, the baggage tag number, the flight number, etc.

Various baggage service systems are known as proposed in JP-A-50-50896 (the term "JP-A" as used herein means an "unexamined published Japanese patent application"), JP-A-U-60-19073 (the term "JP-A-U" as used herein means an "unexamined published Japanese utility model application"), JP-A-U-63-192075, JP-A-U-62-53481, JP-A-U-62-123681, and JP-A-U-1-231083.

With the recent rapid increase in the number of air travelers, accuracy and speediness in baggage service have been demanded, and to cope with this demand, baggage management using a read-out recording system, such as heat-sensitive recording, heat transfer recording, laser printing, etc., has been established.

Baggage tags made of waterproof synthetic paper or coated paper have been proposed as disclosed in JP-B-U-2-45893 (the term "JP-B-U" as used herein means an "examined published Japanese utility model application") and have already been put to practical use.

Baggage tags made of synthetic paper comprising a stretched polyolefin film containing an inorganic fine powder and thereby having fine voids are excellent in terms of waterproofness owing to the polyolefin and are excellent in terms of printability owing to the presence of the fine voids. Such baggage tags also have better strength than those made of coated paper.

However, it often happens that workers pull the baggage by its tag in baggage handling. If a long and narrow tag made of such a stretched synthetic resin film with fine voids is so handled, even an initial small scratch easily propagates to a tear, and the whole tag will be torn apart from the baggage. The problem is more serious in the case of tags made of coated paper, which is weaker than synthetic paper and tears readily.

It has thus been demanded to develop baggage tags which are excellent not only in terms of facility of baggage management but also in terms of tear strength, especially in the transverse direction.

SUMMARY OF THE INVENTION

In the light of the above-mentioned problem of conventional air baggage tags, the inventors have conducted extensive investigations on a tag structure composed of (I) a base layer comprising (A) a substrate, (B) a pressure sensitive adhesive layer, and (C) release paper, and (II) a recording layer. As a result, it has now been found that an air baggage tag with excellent tear strength and excellent printability can be obtained by using, as substrate (A), a laminate of ($A^1$) a fine void-containing stretched thermoplastic resin film and ($A^2$) a substantially void-free uniaxially stretched thermoplastic resin film having a transverse Elmendorf tear strength of at least 80 g and a thickness of 10 to 60% of the total thickness of substrate (A). The present invention has been completed based on this finding.

The present invention relates to an air baggage tag readable by a bar code reader which is composed of (II) a recording layer, (A) a substrate, (B) a pressure sensitive adhesive layer, and (C) release paper, wherein the substrate (A) has a laminate structure composed of ($A^1$) a fine void-containing stretched thermoplastic resin film and ($A^2$) a substantially void-free uniaxially stretched thermoplastic resin film having a transverse Elmendorf tear strength of at least 80 g, the thickness of the film ($A^2$) is from 10 to 60% of the total thickness of the substrate (A), and the recording layer (II) is provided on the side of the film ($A^1$) opposite to film ($A^2$) and has printed thereon a bar code.

The substrate of the baggage tag according to the present invention is composed of fine void-containing stretched thermoplastic resin film ($A^1$) and substantially void-free uniaxially stretched thermoplastic resin film ($A^2$) having a transverse Elmendorf tear strength of at least 80 g, the film ($A^2$) having a thickness of 10 to 60% of the total substrate thickness, the film ($A^2$) being laminated to the film ($A^1$) so that the stretching direction of the film ($A^2$) is perpendicular to the direction of higher stretch ratio of the film ($A^1$), and thereby contributes to high tear strength while exhibiting satisfactory printability. The tag once attached to air baggage is not easily torn apart even when pulled during handling of a large number of pieces of air baggage within a limited time.

DETAILED DESCRIPTION OF THE INVENTION

Figure 1:
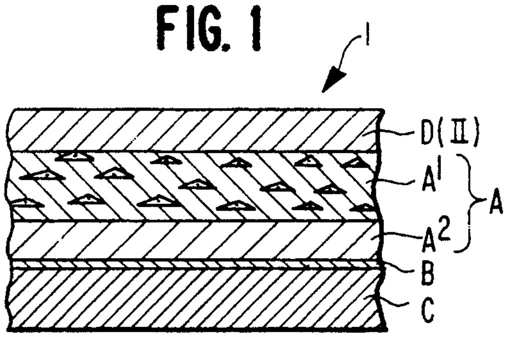
FIGS. 1 and 2 each show a cross section of an air baggage tag according to the present invention.
Figure 2:
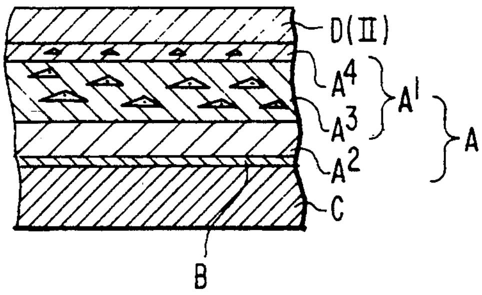

The baggage tag of the present invention is composed of (I) a base layer comprising (A) a substrate, (B) a pressure sensitive adhesive layer, and (C) release paper and (II) a recording layer (e.g., a heat-sensitive recording layer, a heat transfer image-receiving layer, or a coated layer for laser printing).

Substrate (A) is a laminate of ($A^1$) a stretched thermoplastic resin film containing fine voids (hereinafter simply referred to as film ($A^1$)) and ($A^2$) a substantially void-free uniaxially stretched thermoplastic resin film (hereinafter simply referred to as film ($A^2$)) having a transverse Elmendorf tear strength of at least 80 g, and preferably at least 100 g, as measured according to JIS-P 8116, the thickness of film ($A^2$) being from 10 to 60%, and preferably from 15 to 50%, of the total thickness of substrate (A). Film ($A^1$) has formed thereon recording layer (II) hereinafter described.

The fine void-containing film ($A^1$) may be made of known synthetic paper as disclosed, e.g., in JP-B-46-

40794 (the term "JP-B" as used herein means an "examined Japanese patent publication"), JP-B-61-56019, JP-B-62-59668, JP-A-62-35412, JP-A-1-5687, JP-A-3-190787, and U.S. Pat. Nos. 4,318,950, 4,341,880, 3,773,608, 4,191,719, and 4,705,179, JP-B-54-31032, JP-A-2-70479, and JP-A-3-216386.

More specifically, film ($A^1$) includes a single-layered structure comprising a biaxially stretched thermoplastic resin film containing 10 to 45% by weight, and preferably from 15 to 35% by weight, of an inorganic fine powder; a multi-layered structure composed of ($a^1$) a biaxially stretched thermoplastic resin film containing 0 to 45% by weight, and preferably 8 to 30% by weight, of an inorganic fine powder having on both sides thereof ($a^2$) a uniaxially stretched thermoplastic resin film containing 15 to 70% by weight, and preferably 30 to 65% by weight, of an inorganic fine powder (hereinafter sometimes referred to as a paper-like layer); a single-layered structure comprising ($a^3$) a biaxially stretched thermoplastic resin film containing 5 to 60% by weight, and preferably 10 to 45% by weight, of an inorganic fine powder (hereinafter referred to as film ($a^3$)); and a multi-layered structure composed of the film ($a^3$) having provided on one or both sides thereof ($a^4$) a biaxially stretched thermoplastic resin film having a lower void volume than that of film ($a^3$) or having substantially no void (hereinafter referred to as film ($a^4$)).

Film ($a^2$) may be either a single layer or a multi-layered stretched film. Film ($a^4$) contains 0 to 50% by weight, and preferably up to 45% by weight, of an inorganic fine powder and is capable of controlling the smoothness or touch of substrate (A) and printability.

The terminology "void volume" as used herein is a value calculated from the following equation:

$$\text{Void Volume (\%)} = \frac{\rho_0 - \rho}{\rho_0} \times 100$$

$\rho_0$=Density of Unstretched Film $\rho$=Density of Stretched, Void-Containing Film The fine void-containing uniaxially or biaxially stretched thermoplastic resin film ($A^1$) has a void volume of from 10 to 60%, and preferably from 15 to 50%. The biaxially stretched film ($a^4$) which is laminated on one or both sides of film ($a^3$) has a smaller void volume than that of film ($a^3$), i.e., of from 0 to 50%, and preferably 0 to 45%. The biaxially stretched thermoplastic film ($A^1$) composed of ($a^3$) and ($a^4$) has a void volume of from 10 to 60%, and preferably from 15 to 50%.

The thermoplastic resin which can be used as film ($A^1$) having a single layer structure or films ($a^1$), ($a^2$), ($a^3$) and ($a^4$) which constitute film ($A^1$) includes polyolefin resins. Examples of suitable polyolefin resins include polyethylene, polypropylene, an ethylene-propylene copolymer, an ethylene-vinyl acetate copolymer, a propylene-butene-1 copolymer, an ethylene-propylene-butene-1 copolymer, poly(4-methylpentene-1), and polystyrene.

While other thermoplastic resins besides polyolefin resins, such as polyamide, polyethylene terephthalate, and polybutylene terephthalate, may also be used, it is preferable to use polyolefin resins, and particularly propylene-based resins, from the standpoint of cost.

The inorganic fine powder which can be incorporated into film ($A^1$) or films ($a^1$) to ($a^1$) constituting film ($A^1$) include powders of calcium carbonate, calcined clay, diatomaceous earth, talc, titanium oxide, barium sulfate, aluminum sulfate or silica having an average particle size of not more than 10 μm, and preferably not more than 4 μm.

The above-mentioned fine void-containing stretched thermoplastic resin film ($A^1$) can be prepared, for example, as follows.

(i) Film ($A^1$) composed of films ($a^1$) and ($a^2$) may be prepared by uniaxially stretching a thermoplastic resin film containing 0 to 45% by weight, and preferably from 8 to 30% by weight, of an inorganic powder at a stretch ratio of 4 to 10, and preferably 4 to 7, laminating thereon an unstretched thermoplastic resin film containing 15 to 70% by weight, and preferably from 35 to 60% by weight, of an inorganic fine powder, and stretching the laminated film at a stretch ratio of 3 to 15, and preferably 4 to 12, in the direction perpendicular to the stretching direction of the uniaxially stretched film.

(ii) Film ($A^1$)having, a single-layer structure may be prepared by biaxially stretching a thermoplastic resin film containing 5 to 60% by weight, and preferably 10 to 45% by weight, of an inorganic fine powder at a temperature below the melting point of the thermoplastic resin either simultaneously or successively at a stretch ratio of 3 to 10, and preferably 4 to 7, in the machine direction and at a stretch ratio of 3 to 15, and preferably 4 to 12, in the transverse direction.

(iii) Film ($A^1$) composed of films ($a^3$) and ($a^4$) may be prepared by laminating a thermoplastic resin film containing 0 to 50% by weight, and preferably up to 45% by weight, of an inorganic fine powder on one or both sides of a thermoplastic resin film containing 5 to 60% by weight, and preferably 10 to 45% by weight, of an inorganic fine powder and biaxially stretching the laminated film at a temperature below the melting point of the thermoplastic resin either simultaneously or successively at a stretch ratio of 3 to 10, and preferably 4 to 7, in the machine direction and at a stretch ratio of 3 to 15, and preferably 4 to 12, in the transverse direction.

The fine void-containing stretched thermoplastic resin film ($A^1$) preferably has a Young's modulus of from 9,000 to 32,000 kg/cm² as measured according to JIS P-8132. Film ($A^1$) has a thickness of from 30 to 300 μm, and preferably from 40 to 200 μm.

The uniaxially stretched, substantially void-free thermoplastic resin film ($A^2$), which is laminated on film ($A^1$), should have a transverse Elmendorf tear strength of at least 80 g, and preferably from 100 to 500 g, as measured according to JIS P-8116. If the transverse Elmendorf tear strength is less than 80 g, the resulting synthetic paper has insufficient tear resistance for practical use as an air baggage tag.

Film ($A^2$) can be obtained by uniaxially stretching a thermoplastic resin film containing not more than 3% by weight of an inorganic fine powder, and preferably containing no inorganic fine powder, at a temperature below the melting point of the thermoplastic resin at a stretch ratio of 3 to 15, and preferably 4 to 12, either in the machine direction or in the transverse direction.

Having been uniaxially oriented, film ($A^2$) has increased strength in the stretched direction. Further, containing no or little inorganic fine powder and having formed substantially no fine voids even after uniaxial stretching, film ($A^2$) exhibits high Elmendorf tear strength in the transverse direction.

It is important that the thickness of film ($A^2$) should fall within from 10 to 60%, and preferably from 15 to 50%, of the total thickness of substrate (A) (($A^1$)+($A^2$)). If the thickness of film ($A^2$) is less than 10%, sufficient tear strength required for a baggage tag cannot be obtained. If it exceeds 60%, printability would be reduced, although sufficient tear strength is obtained.

Where film ($A^1$) has a laminate structure composed of films ($a^1$) and ($a^2$), film ($A^2$) is laminated to film ($A^1$) so that the stretching direction of film ($A^1$) is perpendicular to that of paper-like film ($a^2$) to thereby form substrate (A) having enhanced strength in both machine and transverse directions.

Where film ($A^1$) is a single biaxially stretched film or has a laminate structure composed of biaxially stretched films ($a^3$) and ($a^4$), film ($A^2$) is laminated to film ($A^1$) so that the stretching direction of film ($A^2$) is perpendicular to the direction of higher stretch ratio of film ($A^1$) to thereby provide substrate (A) having enhanced strength in both machine and transverse directions.

The thermoplastic resin which can be used in the void-free uniaxially stretched thermoplastic film ($A^2$) is usually a polyolefin resin. Examples of suitable polyolefin resins include high-density polyethylene, low-density polyethylene, linear low density polyethylene, polypropylene, an ethylene-propylene copolymer, an ethylene-vinyl acetate copolymer, a propylene-butene-1 copolymer, poly(4-methylpentene-1), and polystyrene. While other thermoplastic resins, such as polyamide, polyethylene terephthalate and polybutylene terephthalate, may also be used as well as the polyolefin resins, polyolefin resins are preferred from the standpoint of cost.

Preferred polyolefin resins are high-density polyethylene having a density of from 0.945 to 0.970 g/cm$^3$ and linear low density polyethylene having a density of from 0.890 to 0.940 g/cm$^3$.

Film ($A^2$) can be prepared, for example, by uniaxially stretching a thermoplastic resin film containing not more than 3% by weight of an inorganic fine powder, and preferably containing no inorganic fine powder, at a temperature below the melting point of the thermoplastic resin at a stretch ratio of 3 to 15.

Stretching of the thermoplastic resin film may be carried out by utilizing a difference in peripheral speed between a pair of rolls, calendering between rolls, tentering, or a combination of these methods.

Film ($A^2$) has a thickness of from 10 to 100 $\mu$m, and preferably from 15 to 70 $\mu$m.

Film ($A^2$) thus obtained is laminated on the uniaxially stretched paper-like film ($a^2$), the biaxially stretched single film ($A^1$), or the biaxially stretched film ($a^3$) so that the stretching direction thereof may have the above-mentioned relationship to that of the film ($A^1$) to obtain substrate (A).

Substrate (A) has a thickness of from 40 to 400 $\mu$m, and preferably from 60 to 160 $\mu$m.

Pressure sensitive adhesive layer (B) may be formed of various pressure-sensitive adhesives, and is preferably formed of a rubber adhesive comprising polyisobutylene rubber, butyl rubber or a mixture thereof dissolved in an organic solvent, such as benzene, toluene, xylene or hexane; the above-mentioned rubber adhesive having incorporated thereinto a tackifier, such as rosin abietate, a terpene-phenol copolymer, or a terpene-indene copolymer; or an acrylic adhesive comprising an acrylic copolymer having a glass transition point of not higher than $-20°$ C., such as 2-ethylhexyl acrylate-ethyl acrylate-methyl methacrylate copolymer, dissolved in an organic solvent.

The pressure-sensitive adhesive is usually coated to a solid coverage of from 3 to 40 g/m$^2$, and preferably of from 10 to 30 g/m$^2$. The thus formed pressure-sensitive adhesive layer (B) usually has a dry thickness of from 10 to 50 $\mu$m in the case of acrylic adhesives or from 80 to 150 $\mu$m in the case of the rubber adhesives.

It is preferable that an anchor coating agent be coated prior to application of the pressure-sensitive adhesive. Examples of suitable anchor coating agents include polyurethane, polyisocyanate-polyether polyol, polyisocyanate-polyester polyol, polyethyleneimine, and an alkyl titanate. These compounds are usually used as dissolved in an organic solvent, such as methanol, ethyl acetate, toluene, or hexane, or water.

The anchor coating agent is usually coated to a dry solids content of from 0.01 to 5 g/cm$^2$, and preferably of from 0.05 to 2 g/m$^2$.

Release paper (C) is composed of release paper having thereon a releasing resin layer. The releasing resin layer is formed by directly coating release paper with a solution of a releasing resin, such as a silicone resin or polyethylene wax, in an organic solvent, followed by drying.

The releasing resin is usually coated to a dry solids content of from 0.5 to 10 g/m$^2$, and preferably from 1 to 8 g/m$^2$. The thus formed release paper layer (C) usually has a thickness of from 20 to 200 $\mu$m.

Recording layer (II) which is to be superposed on the paper-like surface of substrate (A) is formed by coating a coating composition capable of providing any of a heat-sensitive color-developable recording layer, a coating layer for laser printing, and a heat transfer image-receiving layer, on each of which a bar code may be printed.

The heat-sensitive recording layer is formed by coating a coating composition containing a color former and a color developer which are so selected as to undergo a color formation reaction on contact with each other. For example, a colorless or light-colored basic dye may be combined with an inorganic or organic acidic substance, or a higher fatty acid metal salt, e.g., ferric stearate, may be combined with a phenol, e.g., gallic acid. A combination of a diazonium compound, a coupler, and a basic substance may also be employed.

Various compounds are known to be useful as colorless to light-colored basic dyes which can be used as a color former. Typical examples include triarylmethane dyes, e.g., 3,3-bis(p-dimethylaminophenyl)-6-dimethylaminophthalide, 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, 3,3-bis(1,2-dimethylindol-3-yl)-5-dimethylaminophthalide, 3,3-bis(1,2-dimethylindol-3-6-dimethylaminophthalide, 3,3-bis(9-ethylcarbazol-3-yl)-6-dimethylaminophthalide, 3,3-bis(2-phenylindol-3-yl)-6-dimethylaminophthalide, and 3-p-dimethylaminophenyl-3-(1-methylpyrrol-3-yl)-6-dimethylaminophthalide; diphenylmethane dyes, e.g., 4,4'-bisdimethylaminobenzhydryl benzyl ether, an N-halophenylleucoauramine, and N-2,4,5-trichlorophenylleucoauramine; thiazine dyes, e.g., benzoyl Leucomethylene Blue, and p-nitrobenzoyl Leucomethylene Blue; spiro dyes, e.g., 3-methyl-spiro-dinaphthopyran, 3-ethyl-spiro-dinaphthopyran, 3-phenyl-spiro-dinaphthopyran, 3-benzyl-spiro-dinaphthopyran, 3-methyl-naphtho-(6'-methoxybenzo)spiropyran, and 3-propylspirodibenzopyran; lactam dyes, e.g., Rhodamine B anilinolactam, Rhodamine (p-nitroanilino)lactam, and Rhodamine (o-chloroanilino)lactam; and fluoran dyes, e.g., 3-dimethylamino-7-methoxyfluoran, 3-diethylamino-6-methoxyfluoran, 3-diethylamino-7-methoxyfluoran, 3-diethylamino-7-chlorofluoran, 3-diethylamino-6-methyl-7-chlorofluoran, 3-diethylamino-6,7-dimethylfluoran, 3-(N-ethyl-p-toluidino)-7-methylfluoran, 3-diethylamino-7-N-acetyl-N-methylaminofluoran, 3-diethylamino-7-N-methylaminofluoran, 3-diethylamino-7-dibenzylaminofluoran, 3-diethylamino-7-N-methyl-N-benzylaminofluoran, 3-diethylamino 7-N-chloroethyl-N-methylaminofluoran, 3-diethylamino-7-N-diethylaminofluoran, 3-(N-ethyl-p-toluidino)-6-methyl-7-phenylaminofluoran, 3-(N-cyclopentyl-N-ethylamino)-6-methyl-7-anilinofluoran, 3-(N-ethyl-p-toluidino)-6-methyl-7-(p-toluidino)fluoran, 3-diethylamino-6-methyl-7-phenylaminofluoran, 3-diethylamino-7-(2-carbomethoxyphenylamino)fluoran, 3-(N-ethyl-N-isoamylamino)-6-methyl-7-phenylaminofluoran, 3-(N-cyclohexyl-N-methylamino)-6-methyl-7-phenylaminofluoran, 3-piperidino-6-methyl-7-phenylaminofluoran, 3-piperidino-6-methyl-7-phenylaminofluoran, 3-diethylamino-6-methyl-7-xylidinofluoran, 3-diethylamino-7-(o-chlorophenylamino)fluoran, 3-dibutylamino-7-(o-chlorophenylamino)fluoran, 3-pyrrolidino-6-methyl-7-p-butylphenylaminofluoran, 3-N-methyl-N-tetrahydrofurfurylamino-6-methyl-7-anilinofluoran, and 3-N-ethyl-N-tetrahydrofurfurylamino-6-methyl-7-anilinofluoran.

The inorganic or organic acidic substances which form a color on contact with the basic dye are known and include, for example, inorganic substances, such as active clay, acid clay, attapulgite, bentonite, colloidal silica, and aluminum silicate; and organic substances, such as phenol compounds, e.g., 4-t-butylphenol, 4-hydroxydiphenoxide, α-naphthol, β-naphthol, 4-hydroxyacetophenol, 4-t-octylcatechol, 2,2′-dihydroxydiphenol, 2,2′-methylenebis(4-methyl-6-t-isobutylphenol), 4,4′-isopropylidenebis(2-t-butylphenol), 4,4′-sec-butylidenediphenol, 4-phenylphenol, 4,4′-isopropylidenediphenol (bisphenol A), 2,2′-methylenebis(4-chlorophenol), hydroquinone, 4,4′-cyclohexylidenediphenol, benzyl 4-hydroxybenzoate, dimethyl 4-hydroxyphthalate, hydroquinone monobenzyl ether, novolak phenol resins, and phenolic polymers, aromatic carboxylic acids, e.g., benzoic acid, p-t-butylbenzoic acid, trichlorobenzoic acid, terephthalic acid, 3-sec-butyl-4-hydroxybenzoic acid, 3-cyclohexyl-4-hydroxybenzoic acid, 3,5-dimethyl-4-hydroxybenzoic acid, salicylic acid, 3-isopropylsalicylic acid, 3-t-butylsalicylic acid, 3-benzylsalicylic acid, 3-(α-methylbenzyl)salicylic acid, 3-chloro-5-(α-methylbenzyl)salicylic acid, 3,5-di-t-butylsalicylic acid, 3-phenyl-5-(α,α-dimethylbenzyl)salicylic acid, and 3,5-di-α-methylbenzylsalicylic acid, and salts of the above-enumerated phenol compounds or aromatic carboxylic acids with polyvalent metals, e.g., zinc, magnesium, aluminum, calcium, titanium, manganese, tin, and nickel.

These basic dyes (color formers) or color developers may be used either individually or in combinations of two or more thereof. While the color former to developer ratio is not critical and will vary depending on the kinds of the basic dye and the color developer used, the color developer is usually used in an amount of from about 1 to 20 parts by weight, and preferably from about 2 to 10 parts by weight, per part by weight of the basic dye.

The coating composition for the heat-sensitive recording layer is prepared by dispersing the basic dye and/or the color developer either simultaneously or separately in a dispersing medium, usually water, by means of a stirring and grinding machine, such as a ball mill, an attritor or a sand mill.

The coating composition further contains a binder in an amount of from 2 to 40% by weight, and preferably 5 to 25% by weight, based on the total solids content. Usable binders include starch or a derivative thereof, hydroxyethyl cellulose, methyl cellulose, carboxymethyl cellulose, gelatin, casein, gum arabic, polyvinyl alcohol, acetoacetyl-modified polyvinyl alcohol, a diisobutylene-maleic anhydride copolymer salt, a styrene-maleic anhydride copolymer salt, an ethylene-acrylic acid copolymer salt, a styrene-butadiene copolymer emulsion, a urea resin, a melamine resin, an amide resin, and an amino resin.

If desired, the coating composition may further contain various additives, such as dispersing agents, e.g., sodium dioctylsulfosuccinate, sodium dodecylbenzenesulfonate, sodium lauryl alcohol sulfate, and a fatty acid metal salt; ultraviolet absorbents, e.g., benzophenone compounds; defoaming agents, fluorescent dyes, colored dyes, and electrically conductive substances.

If desired, the composition may furthermore contain zinc stearate, calcium stearate, waxes (e.g., polyethylene wax, carnauba wax, paraffin wax, and ester waxes), fatty acid amides (e.g. stearamide, methylenebisstearamide, oleamide, palmitamide, and coconut oil fatty acid amide), hindered phenols (e.g., 2,2′-methylenebis(4-methyl-6-t-butylphenol) and 1,1,3-tris(2-methyl-4-hydroxy-5-t-butylphenyl)butane), ultraviolet absorbents (e.g., 2-(2′-hydroxy-5′-methylphenyl)benzotriazole and 2-hydroxy-4-benzyloxybenzophenone), esters (e.g., 1,2-di(3-methylphenoxy)ethane, 1,2-diphenoxyethane, 1-phenoxy-2-(4-methylphenoxy)ethane, dimethyl terephthalate, dibutyl terephthalate, dibenzyl terephthalate, p-benzylbiphenyl, 1,4-dimethoxynaphthalene, 1,4-diethoxynaphthalene, and phenyl 1-hydroxynaphthoate), various known thermoplastic substances, and inorganic pigments (e.g., kaolin, clay, talc, calcium carbonate, calcined clay, titanium oxide, diatomaceous earth, finely ground anhydrous silica, and active clay).

The heat transfer image-receiving layer is a layer which is brought into contact with a heat transfer sheet and, upon being heated, receives an ink transferred from the heat transfer sheet to form an image.

Such an image-receiving layer is formed by coating a coating composition comprising an oligoester acrylate resin, a saturated polyester resin, a vinyl chloride-vinyl acetate copolymer, an acrylic ester-styrene copolymer, an epoxy acrylate resin, etc. dissolved in a solvent, such as toluene, xylene, methyl ethyl ketone, or cyclohexanone, followed by drying to evaporate the solvent. The coating composition may contain an ultraviolet absorbent and/or a light stabilizer to have increased resistance to light.

Examples of suitable ultraviolet absorbents for the image-receiving layer include 2-(2′-hydroxy-3,3′-di-t-butylphenyl)-5-chlorobenzotriazole, 2-(2-hydroxy-3,5-t-amylphenyl)-2H-benzotriazole, 2-(2′-hydroxy-3′-t-butyl-5′-methylphenyl)-5-chlorobenzotriazole, 2-(2′-hydroxy-3′,5′-t-butylphenyl)benzotriazole, and 2-(2′-hydroxy-3′,5′-di-t-amylphenyl)benzotriazole.

Examples of suitable light stabilizers for the image-receiving layer include distearylpentaerythritol diphosphite, bis(2,4-di-t-butylphenyl)pentaerythritol diphosphite, dinonylphenylpentaerythritol diphosphite, cyclic neopentanetetraylbis(octadecyl phosphite), tris(-nonylphenyl) phosphite, and 1-[2-[3-(3,5-di-t-butyl-4-hydroxyphenyl)propionyloxy]-2,2,6,6-tetramethyl-piperidine.

These ultraviolet absorbent and light stabilizers are each added in an amount of from 0.05 to 10 parts by weight, and preferably from 0.5 to 3 parts by weight, per 100 parts by weight of the resin.

In order to improve releasability from the heat transfer sheet after heat transfer, the image-receiving layer may contain a release agent, such as solid waxes (e.g., polyethylene wax, amide waxes, and Teflon powder), fluorine- or phosphoric acid-type surfactants, and silicone oils, with silicone oils being preferred. Silicone oils may be oily, but hardened oils are preferred.

For the purposes of increasing the whiteness of the image-receiving layer to thereby improve the sharpness of the transferred image, of imparting pencil writability to the surface of the image-receiving layer, and of preventing re-transfer of the transferred image, a white pigment may be added to the image-receiving layer. Examples of suitable white pigments include titanium oxide, zinc oxide, kaolin clay, etc. and mixtures of two or more thereof. Titanium oxide to be used may be either anatase or rutile. Commercially available anatase titanium oxide species include KA-10, KA-20, KA-15, KA-30, KA-35, KA-60, KA-80, and KA-90, all produced by Titan Kogyo K.K., and commercially available rutile titanium oxide species include KR-310, KR-380, KR-460, and KR-480, all produced by Titan Kogyo K.K. The white pigment is added in an amount of from 5 to 90 parts by weight, and preferably from 30 to 80 parts by weight, per 100 parts by weight of the resin.

The heat transfer image-receiving layer usually has a thickness of from 0.2 to 20 μm, and preferably from 3 to 15 μm.

Various heat transfer sheets may be used for transfer of an ink to form an image on the image-receiving layer. The heat transfer sheet is composed of a substrate such as a polyester film having coated thereon a coating composition mainly comprising a binder and a colorant and, if desired, additives such as softening agents, flexibilizers, melting point regulators, smoothing agents, dispersing agents, and the like.

Suitable binders include well-known waxes, e.g., paraffin wax, carnauba wax, and ester waxes, and low-melting high polymers. Suitable colorants include Carbon black, various organic or inorganic pigments or dyes, and sublimation type inks.

The coating layer for laser printing is formed by coating a coating composition basically comprising 40 to 80% by weight of an acrylic or methacrylic acid (hereinafter inclusively referred to as (meth)acrylic acid) ester copolymer having been crosslinked by a urethane linkage (hereinafter referred to as an acrylurethane resin) as a matrix and 20 to 60% by weight of a filler dispersed therein.

The acrylurethane resin to be used is known, as described, e.g., in JP-B-53-32386 and JP-B-52-73985.

The acrylurethane resin can generally be obtained by reacting a urethane prepolymer obtainable from a polyisocyanate and a polyhydric alcohol with a hydroxymono(meth)acrylate. The ethylenic linkage of the acrylurethane resin is polymerized to obtain a (meth)acrylic ester polymer having been crosslinked by a urethane linkage.

The (meth)acrylic ester polymer is a homo- or copolymer of a (meth)acrylic ester having at least one, and preferably one, hydroxyl group in the alcohol ester moiety thereof. Such a hydroxyl-containing polymer has a hydroxyl number of from 20 to 200, and preferably from 60 to 130. The terminology "hydroxyl number" means the number of milligrams of potassium hydroxide necessary to neutralize the acetic acid released by hydrolysis off the acetylation product of a 1 g sample of the polymer.

The (meth)acrylic ester monomer providing such a polymer is a monoester of an alcoholic compound containing at least two, and preferably two, hydroxyl groups per molecule. The terminology "alcoholic compound" as used herein includes polyoxyalkylene glycols containing about 2 or 3 carbon atoms in the alkylene moiety thereof as well as typical alkanols. Specific examples of such (meth)acrylic esters are 2-hydroxyethyl (meth)acrylate, 2-hydroxypropyl (meth)acrylate, di- or polyethylene glycol mono(meth)acrylate, and glycerin mono(meth)acrylate.

From the standpoint of a balance among hardness, toughness and elasticity of the coating composition after hardening, the (meth)acrylic ester polymer is preferably a copolymer. Comonomers copolymerizable with the above-mentioned (meth)acrylic ester are selected appropriately for the particular end from among, for example, methyl to cyclohexyl (meth)acrylates, styrene, vinyltoluene, and vinyl acetate. Instead of starting with a hydroxyl-containing (meth)acrylic ester monomer, the hydroxyl-containing (meth)acrylic ester copolymer may be obtained by subjecting a polymer containing any group capable of being converted to a hydroxyl group to a treatment for converting such a group to a hydroxyl group. Polymerization is advantageously carried out by solution polymerization.

The polyisocyanate for forming a urethane linkage unit includes compounds containing two or more isocyanate groups, such as 2,6-tolylene diisocyanate, 2,4-tolylene diisocyanate, xylylene diisocyanate, diphenylmethane diisocyanate, 1,6-hexamethylene diisocyanate, and derivatives thereof.

A part of the acrylurethane resin may be displaced with a vinyl chloride-vinyl acetate copolymer.

The filler which can be used in the coating composition for a laser printable recording layer includes those conventionally employed, such as calcium carbonate, calcined clay, titanium oxide, barium sulfate, and diatomaceous earth.

The coating composition is coated to a dry solids content usually of from 0.5 to 20 g/m$^2$, and preferably of from 2 to 8 g/m$^2$.

The above-mentioned coating composition for formation of recording layer (II) is coated on the paper-like surface of substrate (A) with a brush, a roller, a pad, a spray gun, etc. or by immersion and then dried at a temperature high enough for volatilization or evaporation of the solvent used. For example, in the case of roll coating, substrate (A) is brought into contact with a rotating roll partly soaked in a coating composition.

Bar code 2 or any other information can be printed on the surface of recording layer (D) by means of a printer, etc. under computer control. If desired, other information, such as the name of the airline, may be printed by various printing methods, such as gravure printing, offset printing, flexographic printing, and screen printing.

Figure 3:
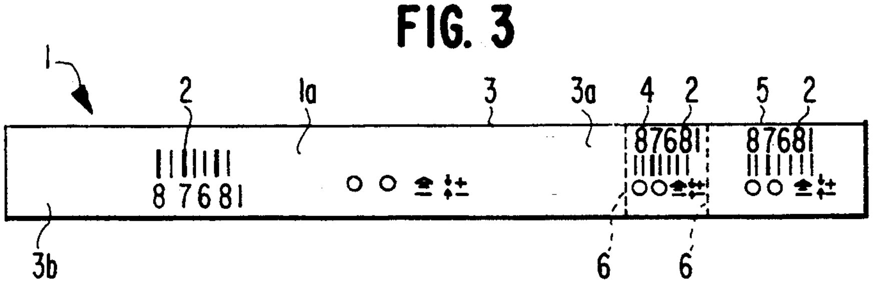
FIGS. 3 and 4 show the surface side and the back side, respectively, of an air baggage tag according to the present invention.
Figure 4:
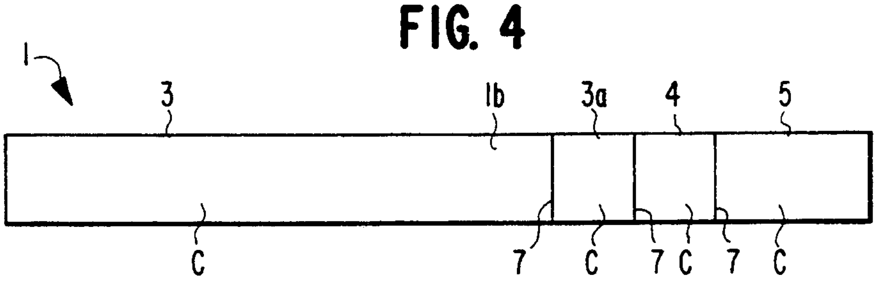
Figure 5:
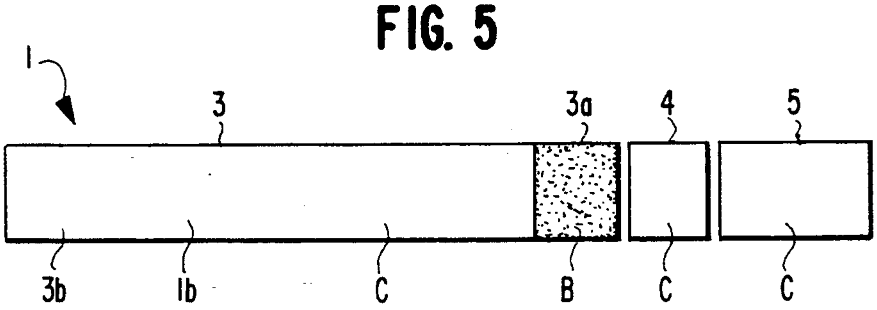
FIG. 5 illustrates the back side of an air baggage tag according to the present invention which is divided into baggage tag 3, trace tag 4, and claim tag 5, with the release paper on one end of baggage tag **3*a* being released to expose the pressure sensitive adhesive layer on that part which is to be stuck to the other end of baggage tag 3*b***.

Baggage management using the baggage tag of the present invention will be explained below by referring to FIGS. 3 to 6. The front surface 1*a* of the baggage tag 1 has a structure as shown in FIG. 3, and the back surface 1*b* thereof has a structure as shown in FIG. 4. Baggage tag 1 may be composed of three parts: baggage tag 3 (3*a* to 3*b*) which is to be attached to a piece of baggage, trace tag 4 which is to be kept by an airline, and claim tag 5 which is to be kept by a passenger, with perforations 6 piercing through recording layer (II), substrate (A) and pressure sensitive adhesive layer (B) between each of these parts for easy separation and with cuts 7 in release paper (C).

When a passenger checks his baggage, tag 1 for each piece of baggage is separated into the three parts; claim tag 5 handed to the passenger, trace tag 4 kept by the airline for baggage management, and baggage tag 3. The release paper of baggage tag 3 at end 3*a* is stripped off to expose pressure sensitive adhesive layer (B) on that end, and after putting the baggage tag through, for example, handle 8*a* of trunk 8, the exposed pressure sensitive adhesive layer (B) at the end 3*a* is stuck on the surface of the other end 3*b* of tag 3 to form a loop.

Where baggage service is controlled under computer management of bar codes, the above-mentioned trace tag 4 may be unnecessary.

Preferred thickness of the baggage tag is from 62 to 604 μm.

The present invention will now be illustrated in greater detail with reference to Examples in view of Comparative Examples, but it should be understood that the present invention should not be construed as being limited thereto. All the percents and parts are by weight unless otherwise indicated.

Physical properties of the films or tags obtained were determined according to the following test methods.

1) Tear Strength:

Measured in accordance with JIS P-8116 by means of an Elmendorf tear strength tester manufactured by Tozai Seiki K.K.

2) Tearing Test:

A tag with a notch on one side in the machine or transverse direction was torn by hand using a single stroke. The tear resistance was evaluated by the feel of the hands and the way of tearing and judged according to ratings "very strong", "strong", "weak (not acceptable for practical use)", or "very weak".

3) Printing Test:

3-1) Heat-Sensitive Recording

A heat-sensitive recording layer of a tag was printed by means of a thermal printer manufactured by Ohkura Denki K.K. (dot density: 8 dots/nun; printing power: 0.19 W/dot) at a varied printing pulse width. The gradation of the resulting print was evaluated with the naked eye and rated as "very good", "good", "poor (not acceptable for practical use)", or "very poor".

3-2) Heat Transfer Recording

A heat transfer image-receiving layer of a tag was printed by means of a thermal printer manufactured by Ohkura Denki K.K. (dot density: 6 dots/mm; printing power: 0.23 W/dot) at a varied printing pulse width. The gradation of the resulting print was evaluated with the naked eye according to the same rating system as in 3-1) above.

3-3) Laser Printing:

A laser printable recording layer of a tag was printed by means of a dry type non-impact laser beam printer "SP8-X" manufactured by Showa Joho K.K., and the resulting toner image was evaluated with the naked eye according to the same rating system as in 3-1) above.

EXAMPLE 1

1) Preparation of Fine Void-Containing Stretched Thermoplastic Resin Film ($A^1$):

1-1)

A composition ($a^1$) consisting of 79% of polypropylene (hereinafter abbreviated as PP) having a melt flow rate (MFR) of 0.8 g/10 min, 5% of high-density polyethylene (hereinafter abbreviated as HDPE), and 16% of calcium carbonate having an average particle size of 1.5 μm was kneaded in an extruder set at 270° C. and extruded into a film, followed by cooling in a cooling apparatus.

The resulting unstretched film was heated to 140° C. and stretched 5 times in the machine direction to prepare a 5-fold stretched film.

1-2)

A composition ($a^2$) consisting of 55% of PP having an MFR of 4.0 g/10 min and 45% of calcium carbonate having an average particle size of 1.5 μm was kneaded in an extruder set at 270° C. and extruded into a film. The resulting film was laminated on both sides of the 5-fold stretched film in 1-1) and cooled to 60° C. The laminated film was reheated to 162° C. and stretched 7.5 times in the transverse direction by means of a tenter, followed by annealing at 165° C. After cooling to 60° C., the stretched laminate was trimmed to obtain fine void-containing synthetic paper composed of three layers having a total thickness of 60 μm (($a^2$)/($a^1$)/($a^2$)=15/30/15 μm) (void volume: 28%).

2) Preparation of Substrate (A):

A uniaxially stretched HDPE film ($A^2$) ("Nisseki Barrila Film HG" produced by Nippon Petrochemicals Co., Ltd.; thickness: 25 μm; transverse Elmendorf tear strength: 250 g) was adhered to the three-layered synthetic paper prepared in 1) above with an adhesive ("Oribain" produced by Toyo Moment K.K.) in such a manner that the stretching direction of the paper-like layer ($a^2$) of the synthetic paper and that of the HDPE film ($A^2$) made a right angle.

3) Preparation of Base Layer (I):

An acrylic adhesive was coated on HDPE film ($A^2$) of substrate (A) to a solid coverage of 25 g/m², and 60 μm thick release paper was adhered thereon to obtain base layer (I).

4) Formation of Heat-Sensitive Recording Layer:

| Solution A: | |
|---|---|
| 3-(N-Ethyl-N-isoamylamino)-6-methyl-7-phenylaminofluoran | 10 parts |
| Dibenzyl terephthalate | 20 parts |
| Methyl cellulose (5% aq. solution) | 20 parts |
| Water | 40 parts |

The above components were mixed and ground in a sand mill to an average particle size of 3 μm.

| Solution B: | |
|---|---|
| 4,4-Isopropylidenediphenol | 30 parts |
| Methyl cellulose (5% aq. solution) | 40 parts |

-continued

| Solution B: | |
|---|---|
| Water | 20 parts |

The above components were mixed and ground in a sand mill to an average particle size of 3 μm.

Ninety parts of Solution A, 90 parts of Solution B, 30 parts of a silicon oxide pigment ("Mizucasil P-527" produced by Mizusawa Kagaku K.K.; average particle size: 1.8 μm; oil absorption: 180 cc/100 g), 300 parts of a 10% aqueous solution of polyvinyl alcohol, and 28 parts of water were mixed and stirred to prepare a coating composition.

An aqueous coating composition comprising a polyethyleneimine-based anchor coating agent and silica for anti-blocking was coated on the paper-like layer ($a^2$) of base layer (I) to form an anchor coat layer. Then, the above-prepared coating composition for a heat-sensitive recording layer was coated thereon to a dry coverage of 5 g/m$^2$, dried, and subjected to supercalendering to obtain an air baggage tag with a heat-sensitive recording layer.

A bar code as shown in FIG. 3 was printed on the resulting tag, and the print was evaluated. The results obtained are shown in Table 1.

EXAMPLE 2

An air baggage tag with a heat transfer image-receiving layer was obtained in the same manner as in Example 1, except that a coating composition for a heat transfer image-receiving layer having the following formulation was coated on the paper-like layer ($a^2$) of base layer (I) by wire bar coating to a dry thickness of 4 μm and dried to form a heat transfer image-receiving layer.

| Formulation of Heat Transfer Image-Receiving Layer: | |
|---|---|
| Vylon 200 (saturated polyester produced by Toyobo Co., Ltd.; TK = 67° C.) | 5.3 parts |
| Vylon 290 (saturated polyester produced by Toyobo Co., Ltd.; TK = 77° C.) | 5.3 parts |
| Vinylite VYHH (vinyl chloride copolymer produced by Union Carbide) | 4.5 parts |
| Titanium oxide KA-10 (produced by Titan Kogyo K.K.) | 1.5 parts |
| KF-393 (amino-modified silicone oil produced by Sin-Etsu Silicone Co., Ltd.) | 1.1 parts |
| X-22-343 (epoxy-modified silicone oil produced by Sin-Etsu Silicone Co., Ltd.) | 1.1 parts |
| Toluene | 30 parts |
| Methyl ethyl ketone | 30 parts |
| Cyclohexanone | 22 parts |

A bar code as shown in FIG. 3 was printed on the tag by using a heat transfer sheet, and the transferred image was evaluated. The results obtained are shown in Table 1.

EXAMPLE 3

An air baggage tag with a coated layer for non-impact laser beam printing was obtained in the same manner as in Example 1, except that a coating composition for a laser printing recording layer prepared as follows was coated on the paper-like layer ($a^2$) of base layer (I) to a dry solids content of 3 g/m$^2$ and hardened at 80° C. for 1 hour.

Preparation of Coating Composition for Laser Printing Recording Layer:

Fifteen parts of 2-hydroxyethyl methacrylate, 50 parts of methyl methacrylate, 35 parts of ethyl acrylate, and 100 parts of toluene were charged in a three-necked flask equipped with a stirrer, a reflux condenser, and a thermometer. After purging with nitrogen, 0.6 part of 2,2-azobisisobutyronitrile was added thereto as a polymerization initiator, and polymerization was carried out at 80° C. for 4 hours to obtain a 50% toluene solution of a hydroxyl-containing methacrylic ester polymer having a hydroxyl number of 65.

70 parts of 75% ethyl acetate solution of "Coronate HL" (hexamethylene isocyanate compound produced by Nippon Polyurethane Co., Ltd.) and 30 parts of calcium carbonate powder having an average particle size of 1.5 μm were added to the toluene solution, and the composition was adjusted to a solids content of 40% with butyl acetate.

A bar code as shown in FIG. 3 was printed on the tag by a non-impact laser beam printer, and the toner image was evaluated. The results obtained are shown in Table 1.

EXAMPLE 4

An air baggage tag with a heat-sensitive recording layer was prepared in the same manner as in Example 1, except for replacing the uniaxially stretched HDPE film ("Nisseki Barrila Film HG") as film ($A^2$) with a uniaxially stretched HDPE film ("PE3K-BT #50" produced by Futamura Kagaku K.K.; thickness: 50 μm; transverse Elmendorf tear strength: 230 g).

A bar code as shown in FIG. 3 was printed on the tag in the same manner as in Example 1, and the print was evaluated. The results obtained are shown in Table 1.

EXAMPLE 5

An air baggage tag with a heat-sensitive recording layer was prepared in the same manner as in Example 1, except for replacing the uniaxially stretched HDPE film ("Nisseki Barrila Film HG") as film ($A^2$) with a uniaxially stretched HDPE film ("PE3K-BT #25" produced by Futamura Kagaku K.K.; thickness: 25 μm; transverse Elmendorf tear strength: 180 g).

A bar code as shown in FIG. 3 was printed on the tag in the same manner as in Example 1, and the print was evaluated. The results obtained are shown in Table 1.

Comparative Example 1

An air baggage tag with a heat-sensitive recording layer was prepared in the same manner as in Example 1, except for using as substrate (A) 95 μm thick synthetic paper prepared as follows.

A bar code as shown in FIG. 3 was printed on the tag in the same manner as in Example 1, and the print was evaluated. The results obtained are shown in Table 2 below.

Preparation of Substrate A:

A composition ($a^{1'}$) consisting of 79% of PP having an MFR of 0.8 g/10 min, 5% of HDPE, and 16% of calcium carbonate having an average particle size of 1.5 μm was kneaded in an extruder set at 270° C. and extruded into sheeting, followed by cooling in a cooling apparatus. The resulting unstretched sheet was heated to 140° C. and stretched 5 times in the machine direction to obtain a 5-fold stretched sheet.

A composition ($a^{2'}$) consisting of 55% of PP having an MFR of 4.0 g/10 min and 45% of calcium carbonate having an average particle size of 1.5 μm was kneaded in an extruder set at 270° C. and extruded into a film. The extruded film was laminated on both sides of the 5-fold stretched film obtained above. After being cooled to 60° C., the laminated film was reheated to 162° C. and stretched 7.5 times in the transverse direction by means of a tenter, followed by annealing at 165° C. After cooling to 60° C., the stretched laminated film was trimmed to obtain fine void-containing synthetic paper composed of three layers having a total thickness of 95 μm $((a^{2'})/(a^{1'})/(a^{2'}) = 25/45/25$ μm) (void volume: 28%).

Comparative Example 2

An air baggage tag was prepared in the same manner as in Example 1, except for using a uniaxially stretched HDPE film ($A^2$) ("Nisseki Barrila Film HG") alone as substrate (A).

A bar code as shown in FIG. 3 was printed on the tag in the same manner as in Example 1, and the print was evaluated. The results obtained are shown in Table 2.

Comparative Example 3

An air baggage tag was prepared in the same manner as in Example 1, except for using synthetic paper comprising a fine void-containing stretched film ($A^1$) ("Yupo FPG 60" produced by Oji Yuka Goseishi Co., Ltd.; thickness: 60 μm) alone as substrate (A).

A bar code as shown in FIG. 3 was printed on the tag in the same manner as in Example 1, and the print was evaluated. The results obtained are shown in Table 2.

TABLE 1

| | Example 1 | Example 2 | Example 3 | Example 4 | Example 5 |
|---|---|---|---|---|---|
| Substrate (A): | | | | | |
| Film ($A^1$) | uniaxially stretched PP + $CaCO_3$ ($a^2$)/biaxially stretched PP + HDPE + $CaCO_3$ ($a^1$)/uniaxially stretched PP + $CaCO_3$ ($a^2$) | the same as Ex. 1 | the same as Ex. 1 | the same as Ex. 1 | the same as Ex. 1 |
| Film ($A^2$) | uniaxially stretched HDPE (Nisseki Barrila Film HG) | the same as Ex. 1 | the same as Ex. 1 | uniaxially stretched HDPE (PE3K-BT#50) | uniaxially stretched HDPE (PE3K-BT#25) |
| Tear Strength (g) of Film ($A^2$): | | | | | |
| MD | 15 | 15 | 15 | 20 | 18 |
| TD | 250 | 250 | 250 | 230 | 180 |
| ($A^1$)/($A^2$) Thickness (μm) | 60/25 | 60/25 | 60/25 | 60/50 | 60/25 |
| ($A^2$)/(A) Thickness Ratio (%) | 29.4 | 29.4 | 29.4 | 45.5 | 29.4 |
| Tear Strength (g): | | | | | |
| MD | 30 | 30 | 30 | 35 | 30 |
| TD | 230 | 230 | 230 | 150 | 120 |
| Recording Layer (II) | heat-sensitive recording layer | heat transfer image-receiving layer | laser printing recording layer | heat-sensitive recording layer | heat-sensitive recording layer |
| Tearing Test | very strong | very strong | very strong | strong | strong |
| Printing Test | good | good | good | good | good |

TABLE 2

| | Comparative Example 1 | Comparative Example 2 | Comparative Example 3 |
|---|---|---|---|
| Substrate (A) | | | |
| Film ($A^1$) | uniaxially stretched PP + $CaCO_3$ ($a^2$)/ biaxially stretched PP + HDPE + $CaCO_3$ ($a^1$)/ uniaxially stretched PP + $CaCO_3$ ($a^2$) | — | Yupo FPG |
| Film ($A^2$) | — | uniaxially stretched HDPE (Nisseki Barrila Film HG) | — |
| Tear Strength (g) of Film ($A^2$): | | | |
| MD | — | 15 | — |
| TD | — | 250 | — |
| ($A^1$)/($A^2$) Thickness (μm) | 95/— | —/25 | 60/— |
| ($A^2$)/(A) Thickness Ratio (%) | — | 1 | 1 |
| Tear Strength (g): | | | |
| MD | 35 | 15 | 25 |
| TD | 18 | 250 | 14 |
| Recording layer (II) | heat-sensitive recording layer | heat-sensitive recording layer | heat-sensitive recording layer |
| Tearing Test | very weak | very strong | very weak |
| Printing Test | good | very poor | good |

EXAMPLE 6

1) Preparation of Fine Void-Containing Stretched Thermoplastic Resin Film ($A^1$):

A composition consisting of 80% of PP having an MFR of 0.8 g/10 min and a melting point of 167° C. and 20% of calcium carbonate having an average particle size of 1.5 μm was kneaded in an extruder set at 270° C. and extruded into a film, followed by cooling in a cooling apparatus.

The resulting unstretched film was heated to 150° C. and stretched 5 times in the machine direction to prepare a 5-fold stretched film.

The stretched film was again heated to 162° C. and stretched 7.5 times in the transverse direction by using a tenter and subjected to annealing at 167° C. After cooling to 60° C., the stretched film was trimmed to obtain a 60 μm thick fine void-containing biaxially stretched thermoplastic resin film ($A^1$) having a void volume of 38%.

2) Preparation of Substrate (A):

The uniaxially stretched HDPE film ($A^2$) "PE3K-BT #25" was adhered to the film ($A^1$) prepared in (1) above with an adhesive "Oribain" in such a manner that the stretching direction of the film ($A^1$) and that of the HDPE film ($A^2$) made a right angle.

3) Preparation of Base Layer (I):

An acrylic adhesive was coated on the uniaxially stretched HDPE film ($A^2$) of substrate (A) to a solid coverage of 25 g/m², and 60 μm thick release paper was adhered thereon to obtain base layer (I).

4) Formation of Heat-Sensitive Recording Layer (II):

The film ($A^1$) of substrate (A) was coated with the same coating composition for a heat-sensitive recording layer as used in Example 1 in the same manner as in Example 1 and then supercalendered to form heat-sensitive recording layer (II).

A bar code as shown in FIG. 3 was printed on the tag in the same manner as in Example 1, and the print was evaluated. The results obtained are shown in Table 3.

Figure 6:
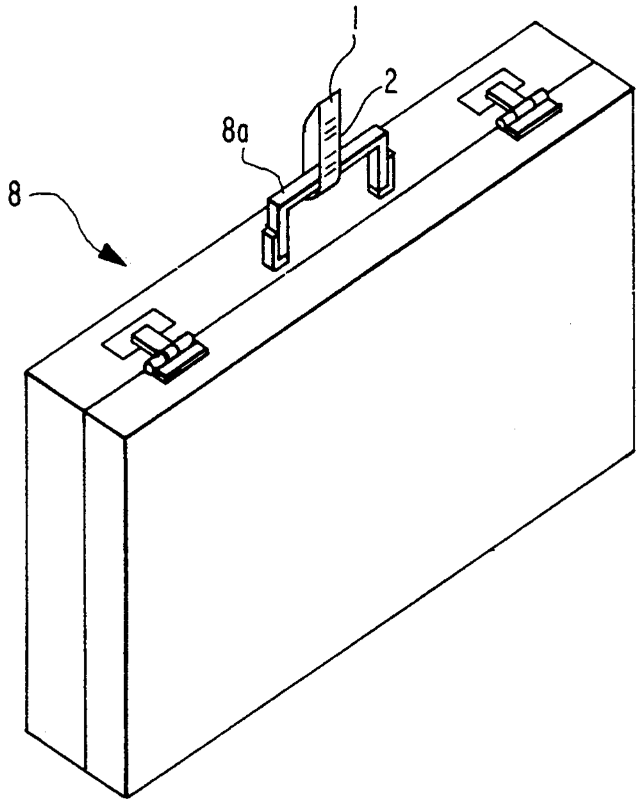
FIG. 6 illustrates a baggage tag attached to a trunk.

Further, the tag was attached to the handle of a trunk as shown in FIG. 6.

EXAMPLE 7

An air baggage tag with a heat transfer image-receiving layer was prepared in the same manner as in Example 6, except for using the same coating composition for a heat transfer image-receiving layer as used in Example 2.

A bar code as shown in FIG. 3 was printed on the tag in the same manner as in Example 2, and the print was evaluated. The results obtained are shown in Table 3.

EXAMPLE 8

An air baggage tag with a laser printing recording layer was prepared in the same manner as in Example 6, except for using the same coating composition for a laser printing recording layer as used in Example 3.

A bar code as shown in FIG. 3 was printed on the tag in the same manner as in Example 3, and the print was evaluated. The results obtained are shown in Table 3.

EXAMPLE 9

An air baggage tag with a heat-sensitive recording layer was prepared in the same manner as in Example 6, except for replacing the uniaxially stretched HDPE film ($A^2$) ("PE3K-BT #25") as used in Example 6 with the uniaxially stretched HDPE film ($A^2$) ("PE3K-BT #50").

A bar code as shown in FIG. 3 was printed on the tag in the same manner as in Example 1, and the print was evaluated. The results obtained are shown in Table 3.

EXAMPLE 10

An air baggage tag with a heat-sensitive recording layer was prepared in the same manner as in Example 6, except for replacing the uniaxially stretched HDPE film ($A^2$) ("PE3K-BT #25") as used in Example 6 with the uniaxially stretched HDPE film ($A^2$) ("Nisseki Barrila Film HG").

A bar code as shown in FIG. 3 was printed on the tag in the same manner as in Example 1, and the print was evaluated. The results obtained are shown in Table 3.

EXAMPLE 11

An air baggage tag with a heat-sensitive recording layer was prepared in the same manner as in Example 6, except for replacing the fine void-containing biaxially stretched thermoplastic film ($A^1$) as used in Example 6 with a fine void-containing biaxially stretched thermoplastic film ($A^1$) having a laminate structure, prepared as follows.

A bar code as shown in FIG. 3 was printed on the tag in the same manner as in Example 1, and the print was evaluated. The results obtained are shown in Table 3.

Preparation of Film ($A^1$):

A composition ($a^3$) consisting of 80% of PP having an MFR of 0.8 g/10 min and a melting point of 167° C. and 20% of calcium carbonate having an average particle size of 1.5 μm and a composition ($a^4$) consisting of 95% of PP having an MFR of 0.8 g/10 min and 5% of ground calcium carbonate having an average particle size of 1.5 μm were separately melt-kneaded in the respective extruders set at 270° C., fed to the same extrusion die, laminated in the molten state within the die in the layer order of $(a^4)/(a^3)/(a^4)$, and co-extruded at 270° C., followed by cooling to about 60° C.

The resulting laminate was heated to 150° C. and stretched 5 times in the machine direction. The uniaxially stretched laminate was again heated up to 162° C. and stretched 7.5 times in the transverse direction by means of a tenter, followed by annealing at 167° C. After cooling to 60° C., the laminate was trimmed to obtain a fine void-containing biaxially stretched thermoplastic resin laminate ($A^1$) composed of three layers having a total thickness of 60 μm ($(a^4)/(a^3)/(a^4)=5/50/5$ μm) (void volume: 37%).

Comparative Example 4

An air baggage tag with a heat-sensitive recording layer was prepared in the same manner as in Example 6, except for using, as substrate (A), a 95 μm thick of fine void-containing biaxially stretched thermoplastic film ($A^1$) which was prepared in the same manner as for the film ($A^1$) used in Example 6 with the exception that the die opening was changed.

A bar code as shown in FIG. 3 was printed on the tag in the same manner as in Example 1, and the print was evaluated. The results obtained are shown in Table 4.

Comparative Example 5

An air baggage tag with a heat-sensitive recording layer was prepared in the same manner as in Example 11, except for using, as substrate (A), a 95 μm thick fine void-containing biaxially stretched thermoplastic film ($A^1$) prepared in the same manner as for the film ($A^1$) used in Example 11 with the exception that the die opening was changed so as to have a film thickness of $(a^4)/(a^3)/(a^4)=5/85/5$ μm.

A bar code as shown in FIG. 3 was printed on the tag in the same manner as in Example 1, and the print was evaluated. The results obtained are shown in Table 4.

Comparative Example 6

An air baggage tag with a heat-sensitive recording layer was prepared in the same manner as in Example 6, except for using, as substrate (A), the 25 μm thick uniaxially stretched HDPE film ($A^2$) ("PE3K-BT #25").

A bar code as shown in FIG. 3 was printed on the tag in the same manner as in Example 1, and the print was evaluated. The results obtained are shown in Table 4.

TABLE 3

| | Example 6 | Example 7 | Example 8 | Example 9 | Example 10 | Example 11 |
|---|---|---|---|---|---|---|
| Substrate (A): | | | | | | |
| Film ($A^1$) | biaxially-stretched PP + $CaCO_3$ | the same as Ex. 6 | the same as Ex. 6 | the same as Ex. 6 | the same as Ex. 6 | biaxially stretched PP + $CaCO_3$ ($a^4$)/ biaxially stretched PP + $CaCO_3$ ($a^3$)/ biaxially stretched PP + $CaCO_3$ ($a^4$) |
| Film ($A^2$) | uniaxially stretched HDPE (PE3K-BT#25) | the same as Ex. 6 | the same as Ex. 6 | uniaxially stretched HDPE (PE3K-BT#50) | uniaxially stretched HDPE film (Nisseki Barrila Film HG) | the same as Ex. 6 |
| Tear Strength of Film ($A^2$) (g): | | | | | | |
| MD | 18 | 18 | 18 | 20 | 15 | 18 |
| TD | 180 | 180 | 180 | 230 | 250 | 180 |
| ($A^1$)/($A^2$) Thickness (μm) | 60/25 | 60/25 | 60/25 | 60/50 | 60/25 | 60/25 |
| ($A^2$)/(A) Thickness Ratio (%) | 29.4 | 29.4 | 29.4 | 45.5 | 29.4 | 29.4 |
| Tear Strength (g): | | | | | | |
| MD | 28 | 28 | 28 | 30 | 27 | 30 |
| TD | 110 | 110 | 110 | 142 | 210 | 113 |
| Recording Layer (II) | heat-sensitive recording layer | heat transfer image-receiving layer | laser printing recording layer | heat-sensitive recording layer | heat-sensitive recording layer | heat-sensitive recording layer |
| Tearing Test | strong | strong | strong | strong | very strong | strong |
| Printing Test | good | good | good | good | good | good |

TABLE 4

| | Comparative Example 4 | Comparative Example 5 | Comparative Example 6 |
|---|---|---|---|
| Substrate (A): | | | |
| Film ($A^1$) | biaxially stretched PP + $CaCO_3$ | biaxially stretched PP + $CaCO_3$ ($a^4$)/ biaxially stretched PP + $CaCO_3$ ($a^3$)/ biaxially stretched PP + $CaCO_3$ ($a^4$) | — |
| Film ($A^2$) | — | — | uniaxially stretched HDPE (PE3K-BT#25) |
| Tear Strength of Film ($A^2$) (g): | | | |
| MD | — | — | 18 |
| TD | — | — | 180 |
| ($A^1$)/($A^2$) Thickness (μm) | 95/— | 95/— | —/25 |
| ($A^2$)/(A) Thickness Ratio (%) | — | — | 1 |
| Tear Strength (g): | | | |
| MD | 32 | 34 | 18 |
| TD | 16 | 16 | 180 |
| Recording Layer (II) | heat-sensitive recording layer | heat-sensitive recording layer | heat-sensitive recording layer |
| Tearing Test | very weak | very weak | very strong |
| Printing Test | very good | very good | very poor |

While the invention has been described in detail and with reference to specific examples thereof, it will be apparent to one skilled in the art that various changes and modifications can be made therein without departing from the spirit and scope thereof.

What is claimed is:

1. An air baggage tag readable by a bar code reader which is comprised of a recording layer, a substrate, a pressure sensitive adhesive layer, and release paper, wherein said substrate has a laminate structure comprised of ($A^1$) a fine void-containing biaxially stretched thermoplastic resin film containing from 5 to 60% by weight of an inorganic fine powder and ($A^2$) a substantially void-free uniaxially stretched thermoplastic resin film having a transverse Elmendorf tear strength of at least 80 g, the thickness of said uniaxially stretched thermoplastic resin film ($A^2$) ranging from 10 to 60% of the total thickness of said substrate, with the stretching direction of said uniaxially stretched thermoplastic resin film ($A^2$) being perpendicular to the stretching direction of the higher stretch ratio of said biaxially stretched thermoplastic resin film ($A^1$), and said recording layer is selected from the group consisting of a heat-sensitive recording layer, a heat transfer image-receiving layer, and a laser printing recording layer and is provided on the side of said stretched thermoplastic resin film ($A^1$) opposite to said stretched thermoplastic resin film ($A^2$) and has printed thereon a bar code.

2. An air baggage tag as claimed in claim 1, wherein the thermoplastic resin of said films ($A^l$) and ($A^2$) is a polyolefin resin.

3. An air baggage tag as claimed in claim 1, wherein the thermoplastic resin of said film ($A^1$) is a propylene resin and that of said film ($A^2$) is a high-density polyethylene or a linear low density polyethylene.

4. An air baggage tag as claimed in claim 1, wherein said fine void-containing biaxially stretched thermoplastic resin film ($A^l$) has a void volume of from 10 to 60% as calculated from equation:

$$\text{Void Volume (\%)} = \frac{\rho_0 - \rho}{\rho_0} \times 100$$

$\rho_0$=Density of Unstretched Film $\rho$=Density of Stretched, Void-Containing Film

5. An air baggage tag as claimed in claim 1, wherein said substrate (A) has a thickness of from 40 to 400 $\mu$m.

6. An air baggage tag as claimed in claim 5, wherein said fine void-containing biaxially stretched thermoplastic resin film ($A^l$) has a thickness of from 30 to 300 $\mu$m, and said

7. An air baggage tag readable by a bar code reader which is comprised of a recording layer, a substrate, a pressure sensitive adhesive layer, and release paper, wherein said substrate has a laminate structure comprised of ($A^1$) a biaxially stretched thermoplastic resin film which is comprised of ($a^3$) a fine void-containing biaxially stretched thermoplastic resin film containing from 5 to 60% by weight of an inorganic fine powder and ($a^4$) a biaxially stretched thermoplastic resin film having a smaller void volume than that of said film ($a^3$) or containing substantially no voids and ($A^2$) a substantially void-free uniaxially stretched thermoplastic resin film having a transverse Elmendorf tear strength of at least 80 g, the thickness of said uniaxially stretched thermoplastic resin film ($A^2$) ranging from 10 to 60% of the total thickness of said substrate, with the stretching direction of said uniaxially stretched thermoplastic resin film ($A^2$) being perpendicular to the stretching direction of the higher stretch ratio of said biaxially stretched thermoplastic resin film ($a^3$), and said recording layer is selected from the group consisting of a heat-sensitive recording layer, a heat-transfer image-receiving layer, and a laser printing recording layer and is provided on the side of said stretched thermoplastic resin film ($a^4$) opposite to said stretched thermoplastic resin film ($a^3$) and has printed thereon a bar code.

8. An air baggage tag as claimed in claim 7, wherein the thermoplastic resin of said films ($a^3$), ($a^4$), and ($A^2$) is a polyolefin resin.

9. Art air baggage tag as claimed in claim 7, wherein the thermoplastic resin of said films ($a^3$) and ($a^4$) is a propylene resin and that of said film ($A^2$) is a high-density polyethylene or a linear low density polyethylene.

10. An air baggage tag as claimed in claim 7, wherein said fine void-containing biaxially stretched thermoplastic resin film ($A^l$) has a void volume of from 10 to 60% as calculated from the equation:

$$\text{Void Volume (\%)} = \frac{\rho_0 - \rho}{\rho_0} \times 100$$

$\rho_0$=Density of Unstretched Film $\rho$=Density of Stretched, Void-Containing Film

11. An air baggage tag as claimed in claim 7, wherein said substrate has a thickness of from 40 to 400 $\mu$m.

12. An air baggage tag as claimed in claim 11, wherein said fine void-containing biaxially stretched thermoplastic resin film ($A^l$) has a thickness of from 30 to 300 $\mu$m, and said uniaxially stretched thermoplastic resin film ($A^2$) has a thickness of from 10 to 100 $\mu$m.

* * * * *